United States Patent Office 3,574,699
Patented Apr. 13, 1971

3,574,699
PROCESS FOR THE PREPARATION OF
DIVINYL CARBONATES
David Rhum, Westfield, and George L. Moore, South
Plainfield, N.J., assignors to Air Reduction Company,
Incorporated, New York, N.Y.
No Drawing. Filed Nov. 1, 1966, Ser. No. 591,094
Int. Cl. C07c 69/00; C08g 17/13
U.S. Cl. 260—463                                3 Claims

ABSTRACT OF THE DISCLOSURE

Vinyl monomers of the formula $$\begin{array}{c} R_1\ R_3\quad\ \ O\quad\ \ R_3\ R_1 \\ |\ \ \ |\quad\ \ \ ||\quad\ \ \ |\ \ \ | \\ C=C-O-C-O-C=C \\ |\quad\quad\quad\quad\quad\quad\quad\ | \\ R_2\quad\quad\quad\quad\quad\quad R_2 \end{array}$$

wherein $R_1$, $R_2$ and $R_3$ are hydrogen or alkyl, are produced by reacting phosgene with a mercury compound of the appropriate aldehyde or ketone, suitably in the presence of a tertiary amine.

---

This invention relates to novel unsaturated compounds and to methods for producing the same.

Vinyl compounds which can be polymerized and copolymerized to form various polymeric materials are known and are extensively used.

It is an object of this invention to provide new polymerizable vinyl monomers which can be readily polymerized to form desirable polymer products.

In accordance with this invention there are provided novel vinyl monomers which are divinyl carbonates, and which can be represented by the formula $$\begin{array}{c} R_1\ R_3\quad\ \ O\quad\ \ R_3\ R_1 \\ |\ \ \ |\quad\ \ \ ||\quad\ \ \ |\ \ \ | \\ C=C-O-C-O-C=C \\ |\quad\quad\quad\quad\quad\quad\quad\ | \\ R_1\quad\quad\quad\quad\quad\quad R_2 \end{array} \quad (1)$$

wherein $R_1$, $R_2$ and $R_3$ can be hydrogen, aryl, such as phenyl, or alkyl. The alkyl group can contain up to 20 carbon atoms, but preferably it is lower alkyl, i.e. containing up to 8 carbon atoms, such as methyl, ethyl, propyl, iso-propyl, butyl, tert-butyl, amyl, hexyl, heptyl, and octyl. The sum of the carbon atoms of $R_1$, $R_2$ and $R_3$ is preferably at most 20, and preferably at least two of $R_1$, $R_2$ and $R_3$ are hydrogen.

When all of $R_1$, $R_2$ and $R_3$ are hydrogen, the compound is divinyl carbonate, which can be represented by the formula $$\text{CH}_2=\text{CH}-\text{O}-\overset{\overset{\text{O}}{||}}{\text{C}}-\text{O}-\text{CH}=\text{CH}_2 \quad (2)$$

When each $R_3$ is methyl, the compound is diisopropenyl carbonate and $R_1$ and $R_2$ are hydrogen, having the formula $$\text{CH}_2=\overset{\overset{\text{CH}_3}{|}}{\text{C}}-\text{O}-\overset{\overset{\text{O}}{||}}{\text{C}}-\text{O}-\overset{\overset{\text{CH}_3}{|}}{\text{C}}=\text{CH}_2 \quad (3)$$

In accordance with this invention, these novel compounds of the Formula 1 are suitably prepared by the reaction of a mercury (II) aldehyde or ketone with phosgene in the presence of a tertiary amine as catalyst, suitably in an inert medium. In the case of divinyl carbonate, this compound is suitably prepared by the reaction of mercury (II) bis-acetaldehyde with phosgene. The reaction can be represented by the following equation:

$$\text{OHCCH}_2-\text{Hg}-\text{CH}_2\text{CHO} + \text{COCl}_2 \longrightarrow$$

$$\text{CH}_2=\text{CH}-\text{O}-\overset{\overset{\text{O}}{||}}{\text{C}}-\text{O}-\text{CH}=\text{CH}_2 + \text{HgCl}_2$$

To prepare diisopropenyl carbonate, chloro mercury acetone is reacted with phosgene in the above-specified reaction system. To prepare other compounds falling within the scope of Formula 1, phosgene is reacted with the appropriate chloro mercury ketone.

The reaction proceeds readily at room temperature and at atmospheric pressure and raising or lowering the temperature of the reaction mixture, or raising or lowering the pressure are not necessary. Any inert solvent may be employed but aliphatic ethers or aliphatic or aromatic hydrocarbon solvents, or normally liquid chlorinated hydrocarbons are preferred. Typical aliphatic ethers, which may be cyclic or acyclic, include dioxane, di-isopropyl ether, di-n-butyl ether, and the like, and typical hydrocarbon solvents include pentane, hexane, heptane, cyclohexane, methyl cyclohexane, benzene, toluene, xylene carbon tetrachloride, and the like. Ordinarily, any inert solvent which is liquid at room temperature can be employed, the solvent suitably being selected so that it can readily be separated from the carbonate by distillation.

In carrying out the reaction, the mercury compound, solvent and catalyst are first added to the reaction vessel, and the phosgene is then gradually introduced. For the best results, anhydrous conditions are maintained.

The product divinyl carbonate is readily separated from the reaction mixture by distillation. The reagents are preferably used in 1:1 mole ratios but the ratio of mercury compound, e.g. mercury (II) bis-acetaldehyde, to phosgene generally ranges between 1.5:1 to 1:1.5, although a higher mole ratio, e.g. up to about 3:1 can be employed. The amount of teritary amine is variable over a wide range, but preferably about one mole of amine per mole of mercury is employed, but ratios can vary in accordance with those specified above, and even beyond.

Any tertiary amine can be employed as catalyst. Typical amines include aliphatic hydrocarbyl amines such as trimethyl amine, triethyl amine, tributyl amine and the like, heterocyclic amines such as pyridine, picoline, quinoline, methyl quinoline, and the like, and aromatic amines such as N,N-dimethyl aniline, N,N-diethyl aniline, and the like.

The following examples, which are given for illustrative purposes only, serve to show the preparation of the divinyl carbonates of this invention and their polymerization.

EXAMPLE I

The reactor was a 1 l. resin kettle fitted with a stainless steel stirring shaft and blade, thermometer, gas inlet tube, and a Dry Ice cold finger condenser was connected to a nitrogen T tube which led to a Dry Ice trap and an equeous $Na_2CO_3$ scrubber. Materials used:

Di-isopropyl ether, freshly distilled—275 ml.
N,N-dimethyl aniline—75 ml., .59 mol.
Mercury bis-acetaldehyde—313.5 g., 1.1 mol.
Phosgene—109 g., 78 ml., 1.1 mol.

The mercury bis-acetaldehyde was prepared according to Nesmeyanov, AN, Lutzenko, IF, Khomutov, RM, Izv. Akad. Nauk SSSR, 8, 942 (1957).

The reactor was dried by purging with $N_2$ and heating. After cooling to room temperature, the first 3 materials were charged into the reactor.

The phosgene was first distilled from the cylinder into a calibrated tube, which was cooled in an isopropanol bath at $-10°$ C., until the volume desired (78 ml.) had condensed.

Keeping the reaction temperature at about 25° C. by means of a cooling bath, the phosgene was allowed to distill from the tube into the gas phase of the reactor from where it was readily absorbed by the reaction mixture. The phosgene addition time was 4 hr. The mixture was finally warmed to 58° C. (over a period of 1½ hr.), and cooled.

The mixture was filtered, and the brittle mercury-containing solids were washed with di-isopropyl ether. The total di-isopropyl ether filtrate was then washed with water, 10% sulfuric acid (to remove any free amine present), 5% NaHCO₃, and finally water. The di-isopropyl ether solution was dried over anhyd. Na₂SO₄.

The dried solution was next distilled through a column packed with SS Heli-pak. Di-isopropyl ether was first removed at 31–35° C./190–80 mm., then the divinyl carbonate distilled at 40.5–43.5° C./70–75 mm., wt.—77.6 g. Conversion (based on 1 mol of mercury bis-acetaldehyde forming 1 mol of divinyl carbonate)—61.7%.

Based on vapor chromatography the divinyl carbonate was 97–99% pure.

EXAMPLE II

Using the procedure of Example I, divinyl carbonate was prepared by the addition of phosgene (100 grams; 1.10 moles) to a suspension of mercury bis-acetaldehyde (649 grams; 2.27 moles) in pentane, containing 65 milliliters of triethylamine. A 17.3% yield of divinyl carbonate (21.7 g.) was obtained by distillation of the reaction products, B.P. at 63 mm. Hg pressure=39° C. Refractive index, $n_D^{20}$=1.4161. Carbon and hydrogen analysis: Calcd. (percent): C, 52.6; H, 5.3. Found (percent): C, 52.93; H, 5.46. The compound absorbs 2 mole-equivalents of hydrogen to produce diethyl carbonate.

EXAMPLE III

Xylene—100 ml.
Sodium carbonate powder—9.0 g., 0.085 mole
Mercury bis-acetaldehyde—43.0 g., 0.15 mole
N,N-dimethylaniline—3.6 g., 0.03 mole
Phosgene—17.5 g., 0.17 mole The phosgene was added to the mixture composed of the xylene, the sodium carbonate, the mercury bis-acetaldehyde and the N,N-dimethylaniline at room temperature in 1¼ hours, and the mixture was warmed to 43° C. The reaction mixture was then filtered, and the divinyl carbonate was separated by fractional distillation. The divinyl carbonate had a boiling point of 31°–36° C./35 mm. and weighed 9.5 g., representing a conversion of 55.5%.

EXAMPLE IV

Xylene—100 ml.
N,N-dimethylaniline—9.7 g., 0.08 mole
Phosgene—15.4 g., 0.15 mole
Mercury bis-acetaldehyde—43.0 g., 0.15 mole At 0° C. the phosgene was added to the dimethylaniline-xylene solution. To this reaction mixture there were added small portions of the mercury bis-acetaldehyde powder. Over the period of 45 min. the temperature was allowed to rise slowly to 24° C. Finally the mixture was warmed to 38° C.

After filtering the DVC (divinyl carbonate) was separated by fractional distillation, B.P. 52°–54°/115 min., wt. 10.3 g., conversion 60.0%.

EXAMPLE V

Water—75 ml.
Diisopropyl ether—50 ml.
Mercury bis-acetaldehyde—43.0 g., 0.15 mole
N,N-dimethylaniline—20.5 g., 0.17 mole
Phosgene—15.4 g., 0.15 mole Phosgene was added over a period of 35 min. at 10° C., followed by warming slowly (1¾ hr.) to 40° C. The reaction mixture was filtered. The ether layer was separated and washed with 10% sulfuric acid and water. After drying over anhydrous sodium sulfate, the isopropyl ether was removed by fractional distillation, after which 2.5 g. of DVC were obtained at 39°–42° C./63–75 mm. Conversion—14.5%.

EXAMPLE VI

Water—75 ml.
Diisopropyl ether—50 ml.
Mercury bis-acetaldehyde—86.0 g., 0.3 mole
Triethylamine—15.1 g., 0.15 mole
Phosgene—30.8 g., 0.3 mole The phosgene was added at 10° C. in 1½ hr., followed by warming to 43° C. No DVC was detected by vapor chromatography.

EXAMPLE VII

Methylene chloride—100 ml.
Sodium carbonate powder—9.0 g., 0.085 mole
Mercury bis-acetaldehyde—43.0 g., 0.15 mole
N,N-dimethylaniline—1.8 g., 0.015 mole
Phosgene—17.5 g., 0.17 mole At room temperature the phosgene was added to the mixture of the other constituents over a period of 1 hr., followed by warming to 39° C.

The reaction mixture was filtered. After fractionally distilling the low boiling methylene chloride, 3.8 g. of DVC were obtained at 35°–36.5° C./59 mm. Conversion—18.9%.

EXAMPLE VIII

Diisopropyl ether—75 ml.
Mercury bis-acetaldehyde—43.0 g., 0.15 mole
Sodium carbonate powder—9.0 g., 0.085 mole
Phosgene—17.5 g., 0.17 mole The phosgene was added in 1¼ hr. at room temperature followed by warming to 40° C. and stirring another 2 hr. The reaction mixture was filtered. The ether filtrate was washed with water, 10% sodium bicarbonate, and water. After drying over anhydrous sodium sulfate, the diisopropyl ether was removed by fractional distillation. The material remaining consisting of 4.5 g. DVC. Conversion—27%.

EXAMPLE IX

Diisopropyl ether—75 ml.
Mercury bis-acetaldehyde—86.0 g., 0.3 mole
Phosgene—36.7 g., 0.37 mole Added phosgene to the mixture at 10°, followed by warming to 49° C. Only a trace of DVC could be detected by vapor chromatography at this point. Over a period of time and at r.t. to 50° C., added a total of 20 ml. of triethylamine.

The mixture was filtered. The ether layer was separated and washed with water, 5% sodium carbonate, and water. Dried over anhydrous sodium sulfate. The isopropyl ether was separated by fractional distillation, followed by distillation of DVC, B.P. 37.5°–41°/58–70 min., wt.—5.0 g., conversion—14.9%.

EXAMPLE X 228 g. chloromercuryacetone, 15.5 cc. dimethyl aniline, and 400 cc. isopropyl ether were stirred in a three-neck 1 liter flask with a CO₂ condenser, and a gas inlet tube connected. The gas inlet tube was attached to a calibrated tube which in turn was connected to a cylinder of phosgene. The phosgene was condensed in the calibrated tube and distilled into the reaction mixture while stirring. The reaction was then heated to 67° and kept at that temperature for 1 hour, the solid portion becoming very sticky. On cooling, the solid portion became taffy-like.

The liquid portion of the reaction mixture was filtered, and the major portion of the isopropyl ether distilled in a Vigreaux column. The remaining portion was distilled at reduced pressure; the distillate of di-isopropenyl carbonate, B.P. 87°/95 mm., was submitted for purification by preparative scale gas chromatography and 10.9 g. of 99.4% pure material was isolated. The infrared spectrum of the compound has a band at 5.65μ for carbonate and 5.95μ for vinyl.

*Elemental analysis.*—Found (percent): C, 58.72; H, 6.77. Calculated (percent): C, 59.2; H, 7.04.

As previously mentioned, the monomers of this invention are suitable for forming polymers, including copolymers; which have utility for forming molded products, coatings and the like. Polymerization can be effected by the usual free-radical polymerization techniques, e.g. with peroxide compounds such as benzoyl peroxide, and azo compounds such as AZN. The following examples show typical polymerizations.

EXAMPLE XI

To 1000 ml. of the divinyl carbonate produced in Example I there was added 8.5 mg. of azobis-isobutyronitrile (AZN), and the mixture was heated at 73° in a nitrogen atmosphere. A white, solid, brittle polymer formed in the course of several minutes.

EXAMPLE XII 1 g. of diisopropenyl carbonate and 2 milligrams of 2,2'-azobisisobutyronitrile were degassed and sealed in a glass tube under vacuum and placed in a bath ranging from 550–76° C. for 16 hours. The tube then contained a small amount of insoluble white powder which was filtered and vacuum dried. The infrared spectrum of the white poly(diisopropenyl carbonate) had a strong absorption at 5.60µ, for the carbonate group. The polymer melted at 195–210° to a clear liquid, without decomposition.

Poly(divinylcarbonate) is of particular utility in being convertible to polyvinyl alcohol by alkaline hydrolysis using the techniques and catalysts used for converting polyvinyl acetate into polyvinyl alcohol. This is illustrated in the following example.

EXAMPLE XIII

The poly(divinylcarbonate) prepared as described in Example XI was suspended in boiling methanol which contained dissolved sodium, i.e. sodium methoxide. A weight of sodium abut 5% of the weight of poly(divinylcarbonate) was used. The suspension was boiled for 20 hours. The supernatant was decanted from the polymer which was then washed several times with methanol and then dried. The infra-red spectrum of the resulting polymer was identical in all important respects with polyvinyl alcohol made in the conventional manner from polyvinyl acetate. The thermal properties of the polyvinyl alcohol were closely similar to those of the conventional polymer, as determined by differential thermal analysis.

We claim:
1. A method of making a divinyl carbonate having the formula

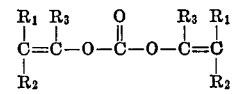

wherein $R_1$, $R_2$ and $R_3$ are hydrogen or lower alkyl which comprises reacting phosgene with a mercury aldehyde or ketone in the presence of a hydrocarbyl tertiary amine and in the presence of an inert solvent liquid at room temperature under anhydrous conditions.

2. A method as defined in claim 1 wherein the mercury compound is mercury (II) bis-acetaldehyde.

3. A method as defined in claim 1 wherein the mercury compound is chloromercuryacetone.

References Cited

UNITED STATES PATENTS

| | | | |
|---|---|---|---|
| 2,370,589 | 2/1945 | Strain et al. | 260—463 |
| 2,370,549 | 2/1945 | Küng | 260—78 |

OTHER REFERENCES

"The Preparation and Polymerization of Divinyl Carbonate," S. Murahashi et al., Bull. Chem. Soc., Japan, 38(11), 1905 (1965).

BERNARD HELFIN, Primary Examiner

L. J. DE CRESCENTE, Assistant Examiner

U.S. Cl. X.R.

260—77.5, 431